UNITED STATES PATENT OFFICE.

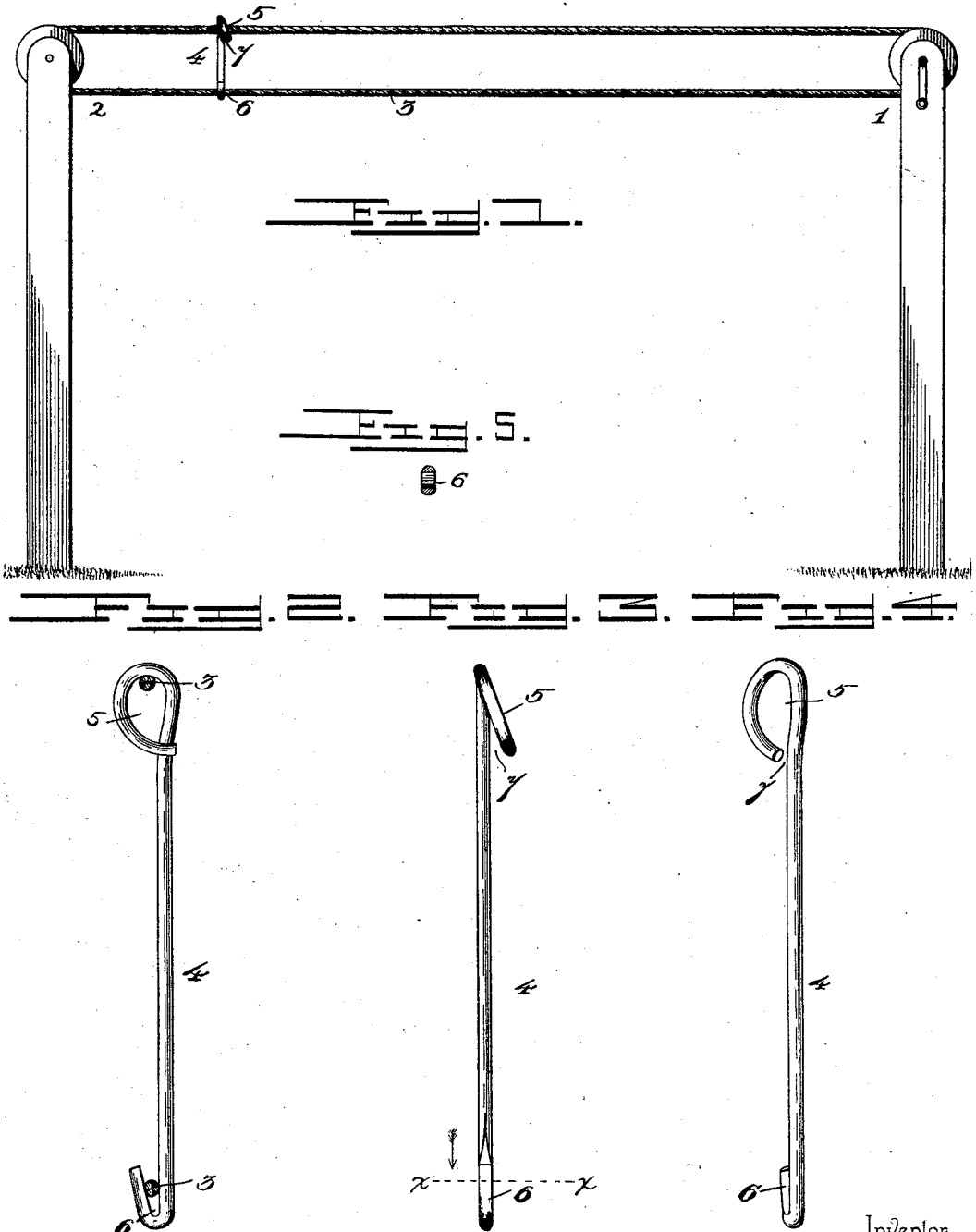

THADDEUS T. PARKER, OF WHEATLAND, OREGON.

CLOTHES-LINE SUPPORT.

SPECIFICATION forming part of Letters Patent No. 589,023, dated August 31, 1897.

Application filed September 8, 1896. Serial No. 605,184. (No model.)

*To all whom it may concern:*

Be it known that I, THADDEUS T. PARKER, a citizen of the United States, residing at Wheatland, in the county of Yamhill and State of Oregon, have invented a new and useful Clothes-Line Support, of which the following is a specification.

This invention relates to that class of clothes-lines which comprise sheave-pulleys located at points distant from each other, one pulley being placed near to a window, porch, or other convenient place at which the clothes are placed upon the line and provided with a crank for operating the pulley to move the line, an endless line supported upon the pulleys, and a support or holder for connecting the upper and lower portions of the line, so as to secure the combined strength of each to sustain the load.

The purpose of the invention is to provide a support or holder which will be light, cheap, and effective for the purpose designed, and which can be quickly applied to and removed from the line and placed within convenient reach, and which will admit of any number being applied to a single line and located at required intervals in the length thereof.

For a full understanding of the merits and advantages of the invention reference is to be had to the accompanying drawings and the following description.

Figure 1 is a side elevation of a clothes-line, showing the application of the invention. Fig. 2 is a side elevation of a support or holder, showing it in operative relation. Fig. 3 is a front view of the support. Fig. 4 is a perspective view thereof. Fig. 5 is a detail section on the line X X of Fig. 3, looking in the direction of the arrow, showing the inner flattened sides of the hooked portion of the wire.

Corresponding and like parts are referred to in the following description and indicated in the several views of the drawings by the same reference-characters.

The sheave-pulleys 1 and 2 are mounted in any convenient way and are properly located, the pulley 1 being arranged within convenient reach of a window, porch, or other place. The line 3 is endless and is supported by the sheave-pulleys 1 and 2 and is adapted to be operated in any of the usual ways when attaching the clothes thereto and operating it so as to expose the clothes for bleaching and drying purposes.

The support or holder 4 is formed from a length of stout wire and is provided at one end with an open eye 5 and at its opposite end with a clamp-hook 6, the latter flaring toward its open end, so as to secure the line by a wedging action, and the opposing sides of the hook being flattened to obtain an extended bearing upon the line held thereby. The eye 5 is formed in the usual way by bending an end portion of the wire and the terminal of the bent portion is deflected laterally away from the body of the wire, so as to leave a space 7 for the ingress and egress of the line when applying or removing the support or holder therefrom. The eye 5 and clamp-hook 6 face in the same direction and the eye receives the upper portion of the line and is adapted to slide thereon and the clamp-hook 6 receives the lower portion of the line and grips the latter and moves therewith, and by reason of the flaring space or throat formed between the bill and the body of the hook the line will be held therein by a wedging action and the greater the load upon the line the more tightly will the latter be gripped or held by the hook, thereby holding the eye 5 at right angles to the plane of the line and preventing the stretch or portion of the line passing through the eye from leaving it or the eye becoming disengaged therefrom.

When it is required to place a support or holder in position, it must be turned so as to bring the eye parallel with the line, after which the line can be passed through the space 7, when the support is turned to bring the eye at right angles to the length of the line, thereby preventing any displacement of the support by any vertical movement of either the support or the line, as the end portion of the wire forming the eye overlaps the main portion of the wire, as seen most clearly in Fig. 2. The lower portion of the line is held by the clamp-hook 6 and the upper portion moves freely through the eye 5, and inasmuch as the supporters or holders can be readily and quickly applied to the line and removed therefrom any required number can be used, so as to connect the upper and lower parts of a line at intervals in its length, thereby preventing the lower portion from sagging and securing the combined strength of the upper and lower parts in supporting the load.

Having thus described the invention, what is claimed as new is—

A support to be used in connection with an endless clothes-line, constructed of a single length of wire having one end flattened and bent to provide a hook, forming a flaring space into which one stretch or portion of the line wedges to secure the support to and fix its position with reference to the said line, and having the opposite end of the wire bent and formed into an eye in about the plane of the hook, the terminal portion of the eye overlapping the body of the wire and being deflected therefrom, forming a lateral passage for the ingress and egress of the opposite portion of the said line upon turning the support to bring its eye and hook in a plane about parallel with the line, substantially as set forth.

In testimony that I claim the foregoing as my own I have hereto affixed my signature in the presence of two witnesses.

THADDEUS T. PARKER.

Witnesses:
W. M. KAISER,
W. J. CARLTON.